No. 791,774. PATENTED JUNE 6, 1905.
T. M. GREGORY.
FORM FOR MAKING SEAMLESS RUBBER ARTICLES.
APPLICATION FILED SEPT. 6, 1904.
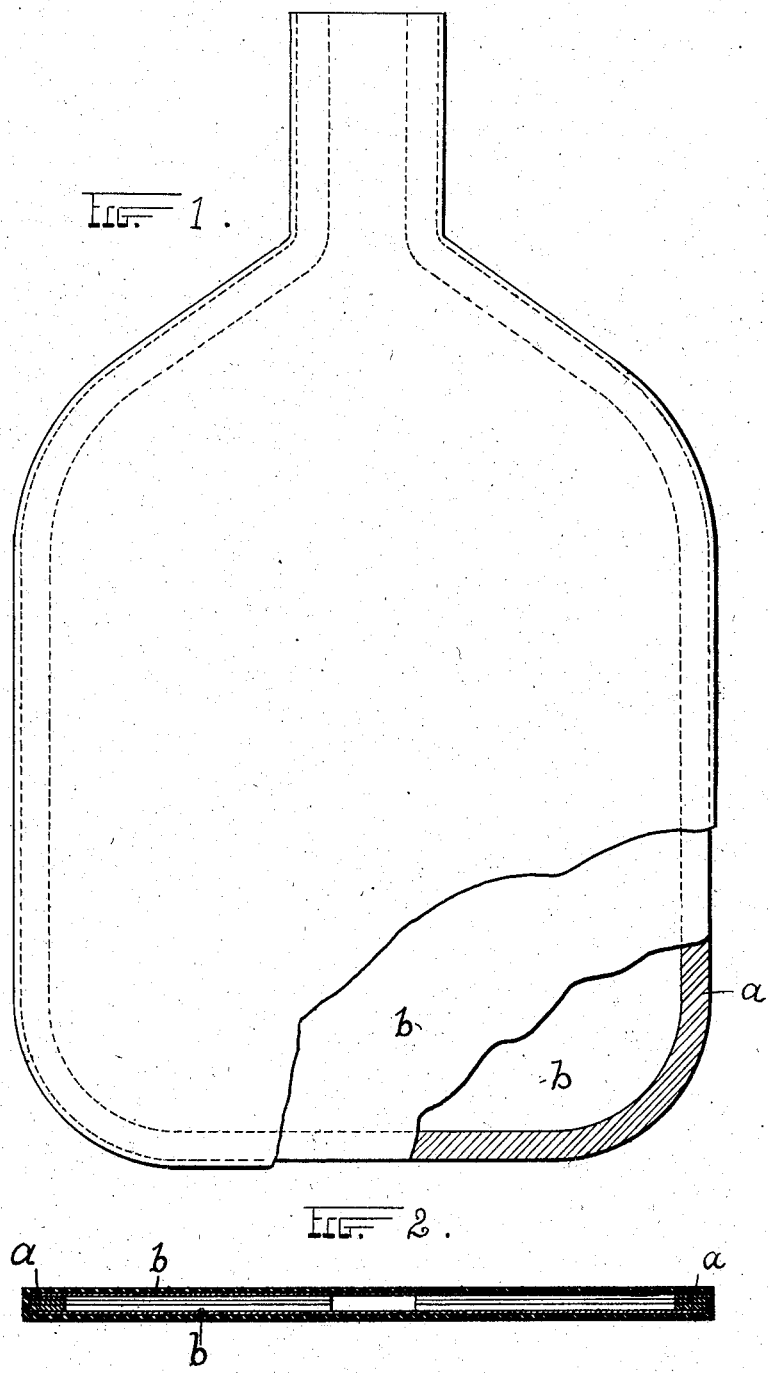

No. 791,774.  
Patented June 6, 1905.

UNITED STATES PATENT OFFICE.

THOMAS M. GREGORY, OF AKRON, OHIO, ASSIGNOR TO THE MILLER RUBBER MANUFACTURING CO., OF AKRON, OHIO, A CORPORATION.

FORM FOR MAKING SEAMLESS RUBBER ARTICLES.

SPECIFICATION forming part of Letters Patent No. 791,774, dated June 6, 1905.

Application filed September 6, 1904. Serial No. 223,419.

*To all whom it may concern:*

Be it known that I, THOMAS M. GREGORY, a citizen of the United States, residing at Akron, in the county of Summit and State of Ohio, have invented certain new and useful Improvements in Forms for Making Seamless Rubber Articles; and I do declare that the following is a full, clear, and exact description of the invention, which will enable others skilled in the art to which it appertains to make and use the same.

My invention relates to a process of making seamless rubber articles, such as water bottles or bags, syringe-bags, and other hollow articles having contracted necks or openings.

So far as I know and believe no one has ever before succeeded in making hollow flexible rubber articles of this kind without one or more seams and ribs where the edges of the parts constituting the article were joined together to complete the manufacture, and the water-bags and syringe-bags on the market and in common use are made with a continuous seam extending entirely around the same at their edges, as is well known. These seams are liable sooner or later to disclose weak places here or there and to become leaky, especially if a poor quality of cement be employed to close the seam or if the bag be filled with excessively hot water and subjected to heavy pressure in use, as occurs when a person rests heavily against the same. For these and other reasons found in the use of these bags, as well as for expensiveness in their manufacture, it is desirable to have a seamless bag which has no weak places, because of defective methods of manufacture, but rather is equally strong at all points and is uniformly smooth over its entire surface by reason of a method of manufacture which avoids all seams and ribs.

To these ends I have conceived the invention herein, which employs a form over or upon which the article is made or developed by dipping the form in a suitable rubber-cement, the same consisting of rubber dissolved in naphtha and such other ingredients as may be advantageously employed therewith in the manufacture and generally comprising more or less sulfur and the like. The said form may be made of any material or quality which can readily be given the desired shape and which when used in the production of a bag, bottle, or other hollow article can be dissolved, disintegrated, or otherwise reduced or broken up, and thus removed through the neck or mouth of the article. Of course it follows that such a form cannot be used over again, and that only a single use is possible; but the invention does not require either expensive material or expensive labor in the manufacture of the forms, and paper-pulp or a suitable grade of paper stretched upon an edging or light frame will serve my purpose. As to this particular step in the manufacture, there is a wide latitude for choice of materials, and I do not limit myself to any special material or manner of getting the same out of the bottle or bag, provided it be adapted to develop the article of manufacture upon its surface by dipping or immersing in the material and to be dissolved, disintegrated, or otherwise integrally softened or destroyed for removal. Having, then, a suitable form to proceed with and the material or cement in suitable state of preparation, the manufacture is carried out by dipping the form in the cement as often as may be required to produce the article, and the number of dippings will depend on the consistency of the cement and the thickness or weight to be given the article. Ordinarily from six to ten immersions will suffice, but there may be more or fewer, as shall be found necessary. After the article has been thus formed it is vulcanized or cured, and this is the end of the process of manufacture so far as the body of the article is concerned, assuming, of course, that the contained form has been removed after the manner of my invention.

Having reference now to the accompanying drawings, forming a part of this specification, Figure 1 is an elevation of a water bottle or bag manufactured according to my invention and having the form therein, and Fig. 2 is a cross-section of bag and form.

The form thus shown consists of a border-frame $a$, preferably of laminated paper glued together, and thus made temporarily rigid, and sides $b$, formed of sheets of suitable paper stretched upon frame $a$ and shellacked or otherwise treated on their outer surfaces to get a smooth finish which the cement will not penetrate and upon which it will adhere and make an even unbroken deposit. This deposit or coating deepens with each immersion until at last the proper thickness is obtained.

What I claim is—

1. A form for manufacturing rubber bags and other hollow articles by a process of dipping in a suitable rubber-cement, the said form having a stiff frame about its edge and flexible sides, substantially as described.

2. In the manufacture of rubber goods, such as water-bottles and kindred hollow articles, a form adapted to be dipped into liquid cement and receive deposits of the same thereon, the said form consisting of a rigid frame and flexible separate sides formed with an open neck, substantially as described.

3. A form for making rubber bags and other like hollow articles having a substantially rigid frame and flexible sides stretched upon said frame and spaced apart thereon, and said sides terminating at their top in a single opening, substantially as described.

4. A form for dipping rubber articles, the same consisting of a substantially rigid frame and sides of sheets of paper stretched upon said frame and having their outer surface treated to prevent the rubber from adhering thereto, substantially as described.

5. A form for making rubber bags and the like having a frame and sides of material adapted to be disintegrated by moisture, said sides stretched upon said frame and spaced apart inside, substantially as described.

In testimony whereof I sign this specification in the presence of two witnesses.

THOMAS M. GREGORY.

Witnesses:
WM. F. PFEIFFER,
SADIE WADSWORTH.